US012247422B2

(12) United States Patent
Kaliebe et al.

(10) Patent No.: US 12,247,422 B2
(45) Date of Patent: Mar. 11, 2025

(54) SAFETY ASSEMBLY FOR PREVENTING OPENING OF A VEHICLE LOCK UNDER PREDEFINED VEHICLE CONDITIONS

(71) Applicant: U-SHIN DEUTSCHLAND ZUGANGSSYSTEME GMBH, Erdweg (DE)

(72) Inventors: Lukas Kaliebe, Erdweg (DE); Yvonne Krauter, Erdweg (DE); Yvan Sierp, Erdweg (DE)

(73) Assignee: U-SHIN DEUTSCHLAND ZUGANGSSYSTEME GMBH (DE)

( * ) Notice: Subject to any disclaimer, the term of this patent is extended or adjusted under 35 U.S.C. 154(b) by 216 days.

(21) Appl. No.: 18/073,896

(22) Filed: Dec. 2, 2022

(65) Prior Publication Data

US 2023/0175294 A1 Jun. 8, 2023

(30) Foreign Application Priority Data

Dec. 3, 2021 (DE) ..................... 10 2021 131 967.6

(51) Int. Cl.

*E05B 83/18* (2014.01)
*E05B 77/24* (2014.01)
*E05B 77/54* (2014.01)
*E05B 81/16* (2014.01)
*E05B 81/30* (2014.01)
*E05B 81/56* (2014.01)

(Continued)

(52) U.S. Cl.

CPC ............ *E05B 83/24* (2013.01); *E05B 77/245* (2013.01); *E05B 77/54* (2013.01); *E05B 81/16* (2013.01); *E05B 81/30* (2013.01); *E05B 81/56* (2013.01); *E05B 83/18* (2013.01); *E05B 83/26* (2013.01)

(58) Field of Classification Search

CPC ........ E05B 77/24; E05B 77/245; E05B 77/54; E05B 81/04; E05B 81/06; E05B 81/16; E05B 81/30; E05B 81/56; E05B 83/18; E05B 83/24; E05B 83/26; E05B 83/36

USPC ....................................................... 701/45, 49

See application file for complete search history.

(56) References Cited

U.S. PATENT DOCUMENTS 8,215,683 B2 7/2012 Drescher et al.
9,284,757 B2 * 3/2016 Kempel .................. E05B 83/26

(Continued)

FOREIGN PATENT DOCUMENTS

DE 19604724 A1 8/1997
DE 102006012062 A1 9/2007

(Continued)

*Primary Examiner* — Erick R Solis
(74) *Attorney, Agent, or Firm* — Dilworth IP, LLC

(57) ABSTRACT

The disclosure relates to a safety assembly for preventing the opening of a trunk lock under predefined vehicle conditions, having a transmission element which is engaged by an interior-side actuating element and a trunk-side actuating element and which is coupled to a trunk lock, wherein a latch is provided which is adjustable between an actuating position, in which an actuating force can be transmitted from at least one of the actuating elements to the trunk lock, and a blocking position, in which an actuating force is not transmitted to the trunk lock, the latch having a gearing and a brushless electric motor associated with it, by means of which the latch can be transferred between the actuating position and the blocking position. The disclosure further relates to a method of controlling a latch of a safety assembly.

10 Claims, 7 Drawing Sheets

(51) Int. Cl.
*E05B 83/24* (2014.01)
*E05B 83/26* (2014.01)

(56) References Cited

U.S. PATENT DOCUMENTS

| | | | | |
|---|---|---|---|---|
| 10,240,663 | B2 | 3/2019 | Nickel | |
| 11,007,972 | B2 | 5/2021 | Miller et al. | |
| 11,384,573 | B2 * | 7/2022 | Sturm | E05B 47/0676 |
| 11,801,900 | B2 * | 10/2023 | Gillis | E05B 77/54 |
| 2007/0216170 | A1 | 9/2007 | Drescher et al. | |
| 2016/0273617 | A1 | 9/2016 | Nickel | |
| 2018/0371807 | A1 | 12/2018 | Sturm et al. | |
| 2019/0092273 | A1 | 3/2019 | Miller et al. | |
| 2019/0203507 | A1 * | 7/2019 | Ney | E05B 81/04 |
| 2019/0338568 | A1 * | 11/2019 | Klein | E05B 81/16 |
| 2020/0378432 | A1 | 12/2020 | Gordon et al. | |
| 2022/0106817 | A1 * | 4/2022 | Holbein | E05B 85/26 |
| 2022/0162887 | A1 * | 5/2022 | Page | E05B 81/16 |

FOREIGN PATENT DOCUMENTS

| | | | |
|---|---|---|---|
| DE | 102006020799 | A1 | 11/2007 |
| DE | 202013103327 | U1 | 12/2014 |
| DE | 102015104111 | A1 | 9/2016 |
| DE | 102015121848 | A1 | 6/2017 |
| DE | 102018123240 | A1 | 3/2019 |
| DE | 102018102874 | A1 | 8/2019 |
| EP | 3390748 | A1 | 10/2018 |

* cited by examiner

SAFETY ASSEMBLY FOR PREVENTING OPENING OF A VEHICLE LOCK UNDER PREDEFINED VEHICLE CONDITIONS

FIELD OF THE INVENTION

The disclosure relates to a safety assembly for preventing the opening of a trunk lock under predefined vehicle conditions, more specifically including a transmission element which is engaged by an interior-side actuating element and a trunk-side actuating element and which is coupled to a trunk lock.

BACKGROUND

The safety assembly is intended in particular for a trunk arranged at the front of a motor vehicle. The trunk lock of this trunk is intended to be able to be opened from the trunk, in order to enable a person locked therein to free himself/herself. However, for safety reasons, it should not be possible to fully open the trunk lock when the vehicle moves at a speed higher than a predetermined limit value, for example 5 km/h. Apart from obstructing the driver's view, if the trunk lid is fully opened at a higher speed, it could hit the windshield due to the airstream.

It is known from the prior art to employ blocking means which allow or block the operation of the lock of the trunk lid depending on the speed.

EP 3 390 748 A1 discloses a solution in which an actuating device is used that has a motor, a gearing, a pivot lever and a coupling element, which in turn acts on a slider. A sensor is further provided for detecting the position of the coupling element. The coupling element is engaged and disengaged as a function of a limit speed. In the disengaged state, there is no continuous actuation chain between the actuating element and the lock.

The object of the disclosure is to simplify the mechanical structure of the safety assembly.

SUMMARY

To achieve this object, according to the disclosure, a safety assembly for preventing complete opening of a trunk lock under predefined vehicle conditions is provided, more specifically including a transmission element which is engaged by an interior-side actuating element and a trunk-side actuating element and which is coupled to a trunk lock, wherein a latch is provided which is adjustable between an actuating position, in which an actuating force can be transmitted from at least one of the actuating elements to the trunk lock, and a blocking position, in which an actuating force is not transmitted to the trunk lock, a gearing and a brushless electric motor being associated with the latch. By means of the gearing and the brushless electric motor the latch can be transferred between the actuating position and the blocking position. This safety assembly has a particularly simple structure, since the position of the latch can be determined at any time by means of the brushless electric motor, without the need to employ an additional sensor to determine the position.

The transmission element may be a slider and the latch may be attached to a mounting plate to which the slider is mounted for displacement. A slider constitutes a component that is simple in design and the adjustability of which can be blocked or released with little effort by means of the latch.

The latch may be arranged in a slot within the slider, the slot including a blocking shoulder with which the latch can cooperate in the blocking position. Owing to the arrangement of the latch within the slider, a particularly compact structure is obtained overall.

A magnet may be provided which can fix the latch in the blocking position. The magnet ensures that the latch remains in the blocking position without any active measures until it is actively moved out of the blocking position by the electric motor.

A magnet may also be provided which can fix the latch in the actuating position. This magnet ensures that the latch remains in the actuating position until it is actively moved out of this position.

The magnet may be received in a pocket on the slider. Such a pocket can be produced with little effort.

The magnet may be snap-fitted within the pocket so that it can be reliably fastened within the pocket with very little effort.

The latch is provided with an anti-wear part made of a ferromagnetic material, which engages around the portions of the latch that cooperate with the slider in the actuating position and in the blocking position, and which can cooperate with the magnet or magnets. This allows the latch itself to be manufactured from a non-ferromagnetic material, for example an injection-moldable plastic, and only the portion in which the magnet or magnets fix the latch in a defined position to be provided with the anti-wear part. In addition, sheet metal, for example, of which the anti-wear part is made, has a higher wear resistance than plastic, from which the latch is made.

The disclosure further comprises a method of controlling a latch of a safety assembly by means of a controller that receives a speed signal, wherein the controller controls the electric motor and moves the latch to the blocking position as soon as the trunk lock is already partly open and the controller receives a speed signal which is above a predefined threshold value, the controller controls the electric motor and moves the latch back to the actuating position as soon as the controller receives a speed signal which is below the predefined threshold value again, wherein, when controlling the electric motor, the controller receives a signal from the electric motor, from which the controller can infer the position of the latch. This method allows the latch to be reliably adjusted as a function of the speed signal and the position of the trunk lock, without the need for an additional sensor for obtaining the required information about the position of the latch.

DETAILED DESCRIPTION

Figure 1:
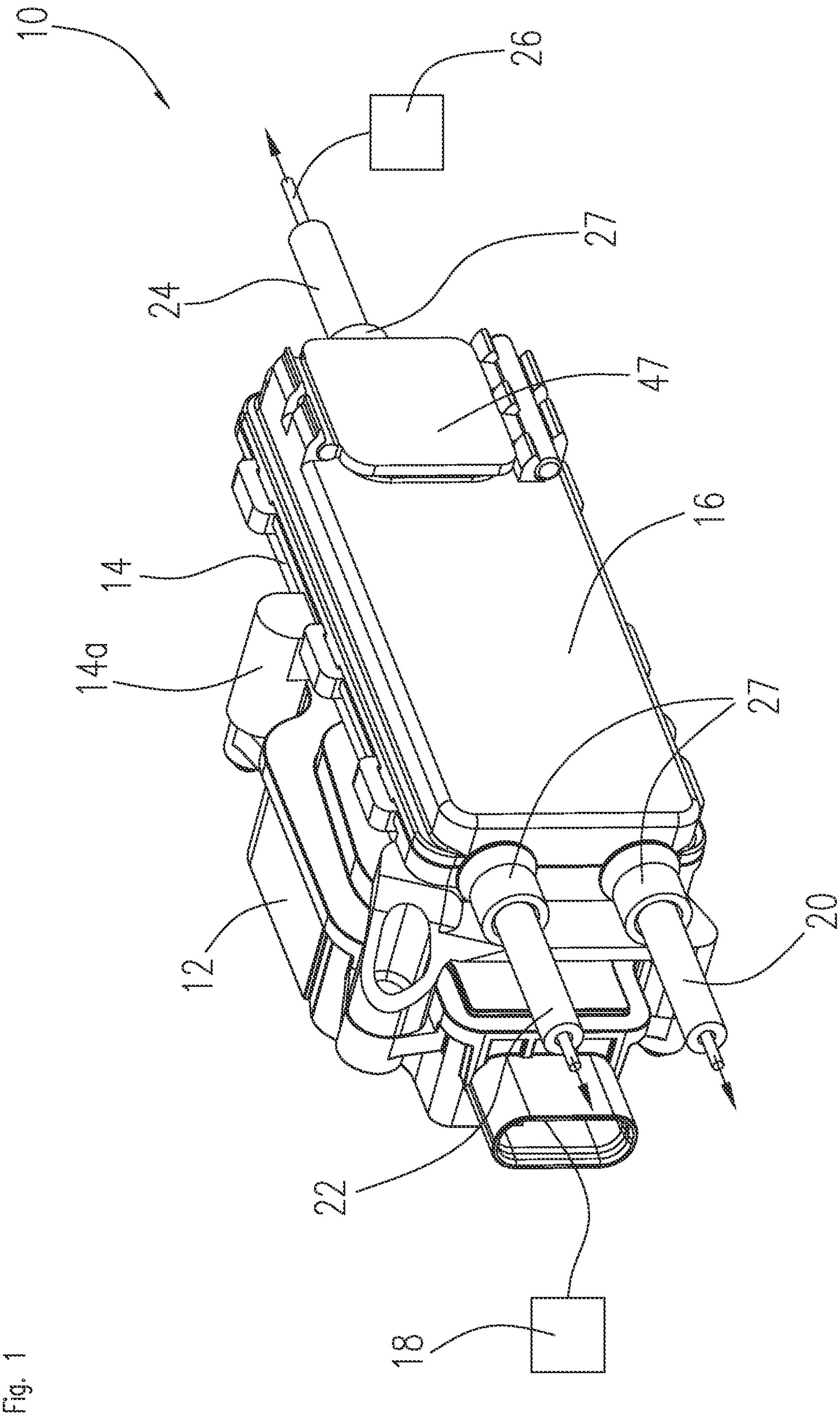
FIG. 1 shows a perspective view of a safety assembly.

FIG. 1 shows a safety assembly 10 that serves to prevent a trunk lock 26 from being opened under predefined driving conditions.

The safety assembly 10 includes an electric motor 12, a mounting plate 14 that is fitted on the electric motor 12 and includes a partial housing, and a housing cover 16 that closes the partial housing of the mounting plate 14 by the fastening elements of the mounting plate 14*a*.

The brushless electric motor 12 is controlled by a controller 18. The controller 18 detects the vehicle condition, more precisely the vehicle speed, by a speed signal and compares whether it exceeds or falls below a predefined threshold value. Furthermore, the controller 18 also detects the opening state of the trunk lock 26. Depending on the result of the comparison, the controller 18 controls the electric motor 12.

The mounting plate 14 provided with the partial housing and the housing cover 16 constitute a closed housing in which a transmission element 28 is received, which is used to transmit a mechanical input signal into an output signal.

The input signal may originate from one of two actuating elements, namely an interior-side actuating element 20 and a trunk-side actuating element 22.

The interior-side actuating element 20 is coupled to a lever or the like that is arranged in the interior of the vehicle and that can be used by a vehicle occupant for unlocking the trunk lid.

The trunk-side actuating element 22 is coupled to a lever or the like that is arranged inside the trunk and that can be used by a person located in the trunk for unlocking the trunk lid.

The output signal is transmitted to a lock-side actuating element 24 that is coupled to the trunk lock.

The actuating elements 20, 22, 24 are in the form of Bowden cables. Alternatively, linkages or other components may also be used which allow tensile or compression forces to be transmitted in the desired manner.

When the transmission element is shifted from an initial position to an actuated position by the interior-side actuating element 20 or by the trunk-side actuating element 22, the lock-side actuating element 24 is actuated, whereby in turn the trunk lock is unlocked.

Figure 2:
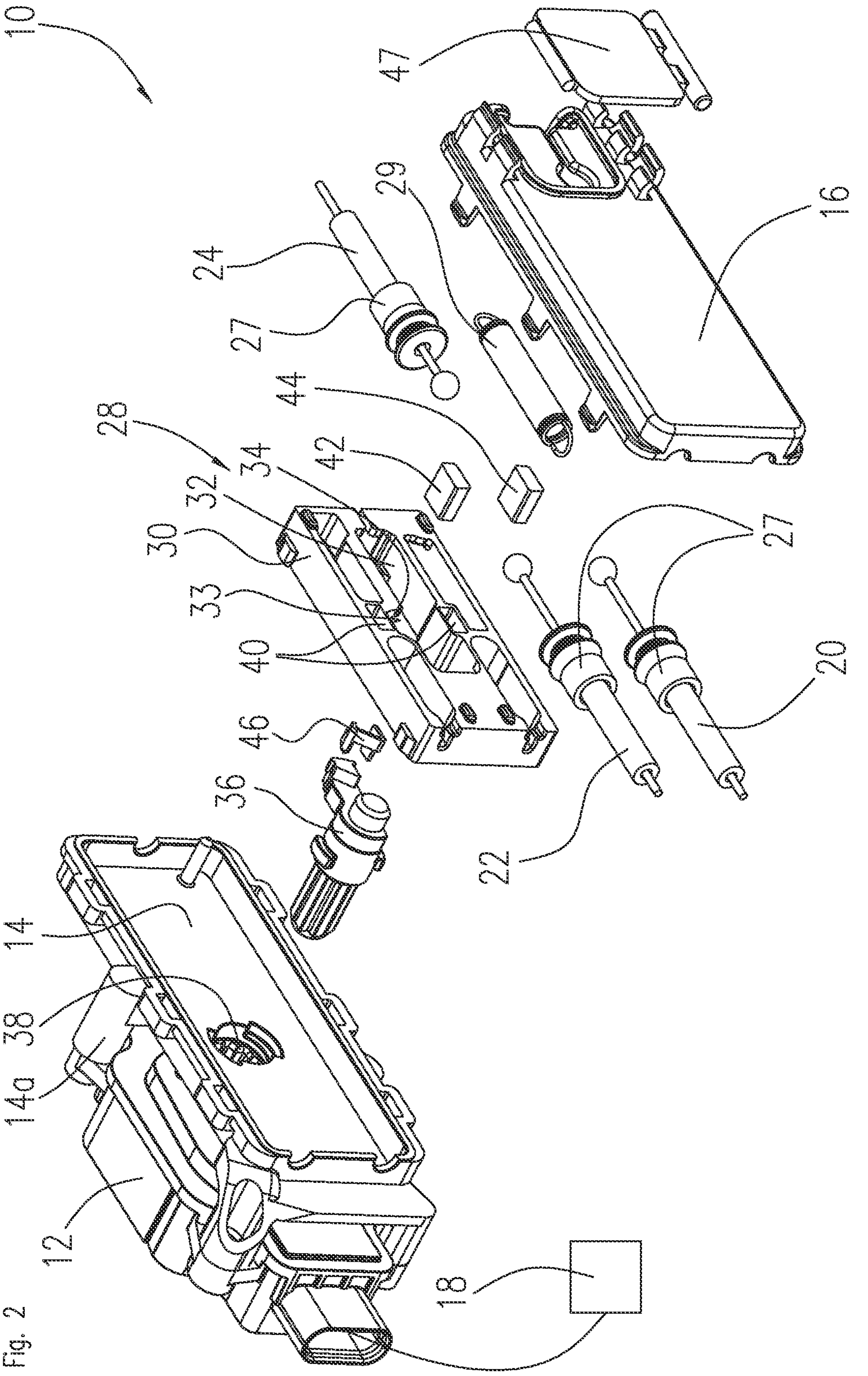
FIG. 2 shows a perspective exploded view of all relevant components of the safety assembly of FIG. 1.
Figure 3:
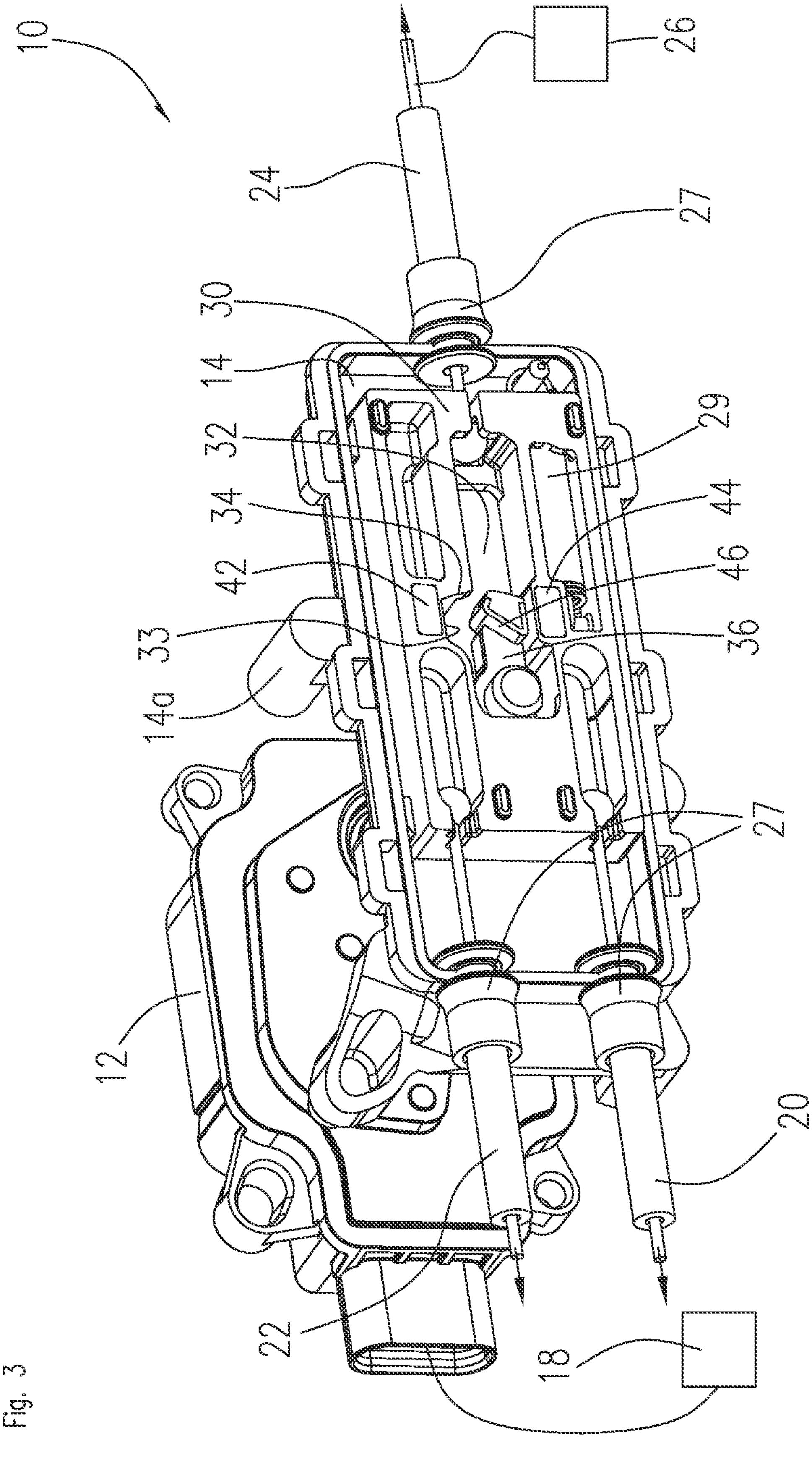
FIG. 3 shows a perspective view of a safety assembly with the latch in the actuating position and the slider in an initial position, with the housing cover not shown for greater clarity.

FIGS. 2 and 3 show the internal structure of the safety assembly. For this purpose, the housing cover 16 is not shown in FIG. 3 for reasons of clarity, since otherwise the mechanism located underneath would not be visible.

The transmission element 28, which is illustrated partially transparent here, is configured as a slider 30 and is arranged and displaceably guided within the housing formed by the mounting plate 14 and the housing cover 16. As a result, an actuating force that is applied to the transmission element 28 by one of the input-side actuating elements 20, 22 can be transmitted to the output-side actuating element 24.

The slider 30 has a slot 32, which is provided with a lateral recess 33 approximately in the middle. The edge of the recess forms a blocking shoulder 34 on the side on which the lock-side actuating element 24 engages.

A latch 36 is arranged within the slot 32 and can cooperate with the blocking shoulder 34. The slot extends parallel to the direction of adjustment of the transmission element 28.

The latch 36 includes a shank that is provided with a toothing and by means of which the latch 36 is coupled to a gearing 38. The gearing 38 is in turn coupled to the brushless electric motor 12. This allows the latch 36 to be adjusted between a blocking position (see FIGS. 5 and 6) and an actuating position (see FIGS. 3, 4 and 7) by driving the brushless electric motor 12.

In the actuating position, the latch 36 extends within the slot 32. In other words, the longitudinal axis of the latch runs parallel to the direction in which the slot 32 extends.

In the blocking position, the free end of the latch 36 projects into the recess 33.

In order to fix the latch 36 in its respective position, a respective pocket 40 is provided in the slider 30 in the area of the blocking shoulder 34 and in the area of the opposite side of the slot 32, in which a magnet 42 and, respectively, 44 are arranged. The magnets are mechanically snap-fitted in the pockets 40.

The magnets 42, 44 cooperate with an anti-wear part 46 which surrounds the free end of the latch 36. It is made of a ferromagnetic material, for example sheet steel.

With reference to FIGS. 3 to 7, the operation of the safety assembly 10 will be discussed below; in all of these Figures, the housing cover 16 is not illustrated in order to make it easier to understand the kinematics of the components of the safety assembly 10.

FIG. 3 shows the initial condition.

In the initial condition, the transmission element 28 is on the side of the lock-side actuating element 24, so that the end of the slot 32 that is located on the side of the actuating elements 20, 22 is close to that end of the latch 36 that is coupled to the gearing 38. The latch 36 is in the actuating position, in which its free end is within the slot 32.

This condition exists when the speed of the vehicle is below a predefined limit value.

Figure 4:
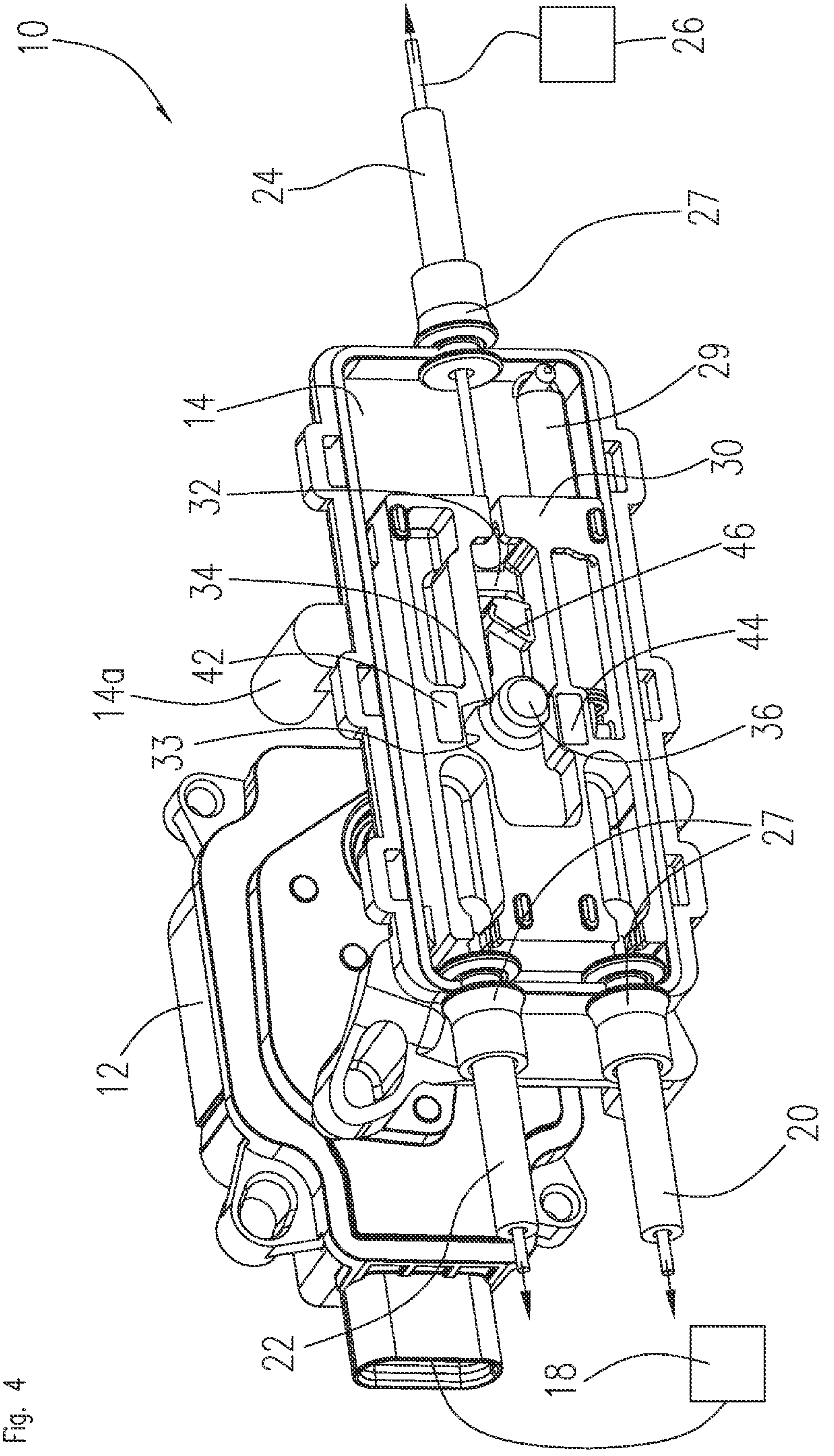
FIG. 4 shows the safety assembly of FIG. 3, with the latch in the actuating position and the slider in an actuated position.

When the latch 36 is in the actuating position, the transmission element 28 can be shifted, under the action of an actuating force applied by the interior-side actuating element 20 or the trunk-side actuating element, to an actuated position, in which the lock-side actuating element 24 has been actuated. This condition is shown in FIG. 4.

In the actuated position, the transmission element 28 has been displaced so far that the end of the slot 32 facing the lock-side actuating element 24 is located near the end of the free end of the latch 36. The lock-side actuating element 24 has been actuated to such an extent that the trunk lock is unlocked.

As soon as the input-side actuating force is no longer applied, the slider 30 is shifted to the right again to the initial position of FIG. 3 by a return spring 29. In this position, the magnet 44 acts again, fixing the latch 36 in the actuating position.

Figure 5:
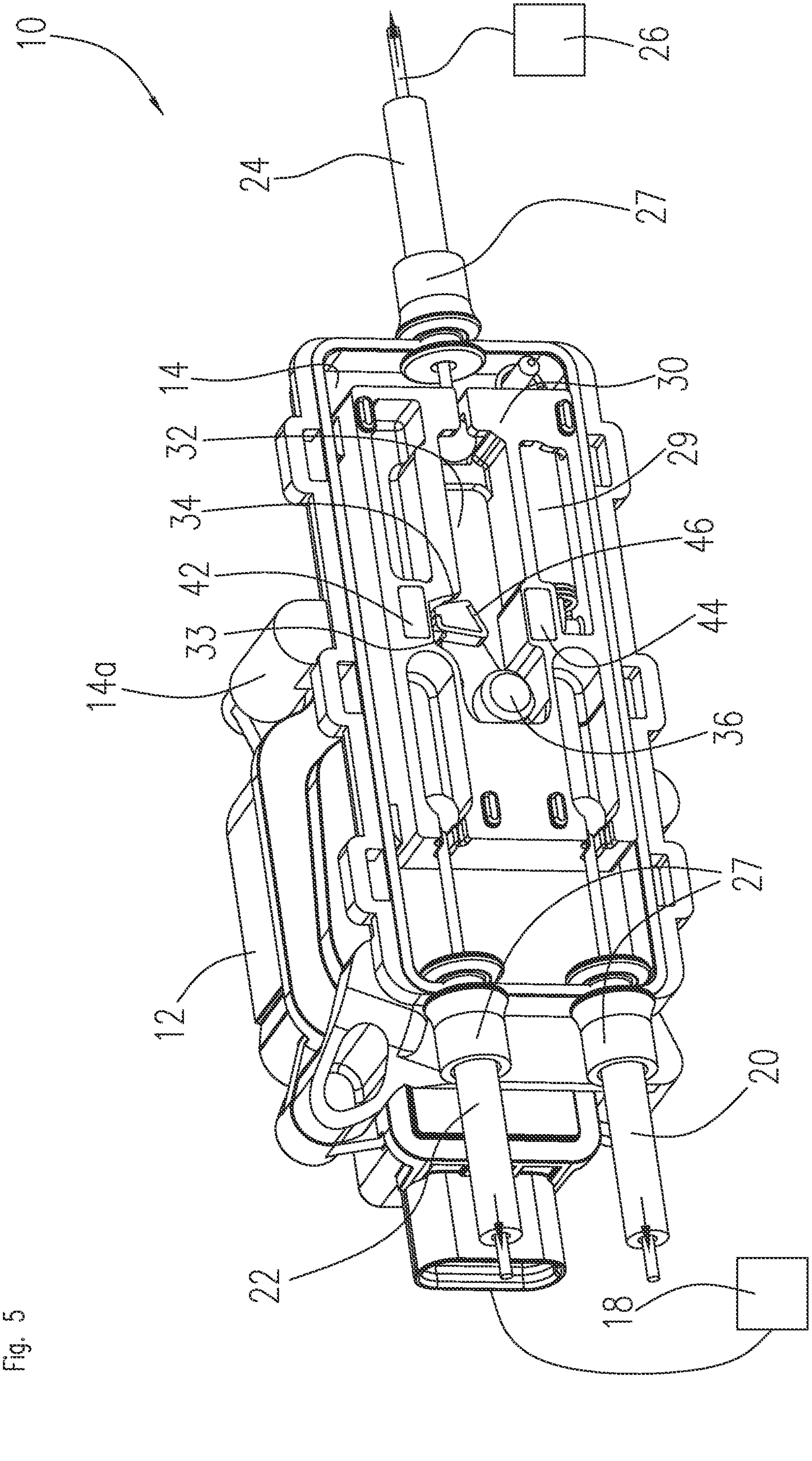
FIG. 5 shows the safety assembly of FIG. 3, with the latch having been moved to the blocking position and the slider being in the initial position.

When the controller 18 detects that the speed of the vehicle is above the limit value and the trunk lock is in a partially open position, it controls the electric motor 12 so that the latter pivots the latch from the actuating position to the blocking position (see FIG. 5). In this position, the latch 36 engages by its free end in the recess 33 so that the free end is opposite the blocking shoulder 34.

In the blocking position, the magnet 42 cooperates with the anti-wear part 46 so that the latch 36 is fixed in the blocking position.

In the blocking position, the latch 36 prevents the transmission element 28 from being shifted from the initial position to the actuated position. This can be seen in FIG. 6.

Figure 6:
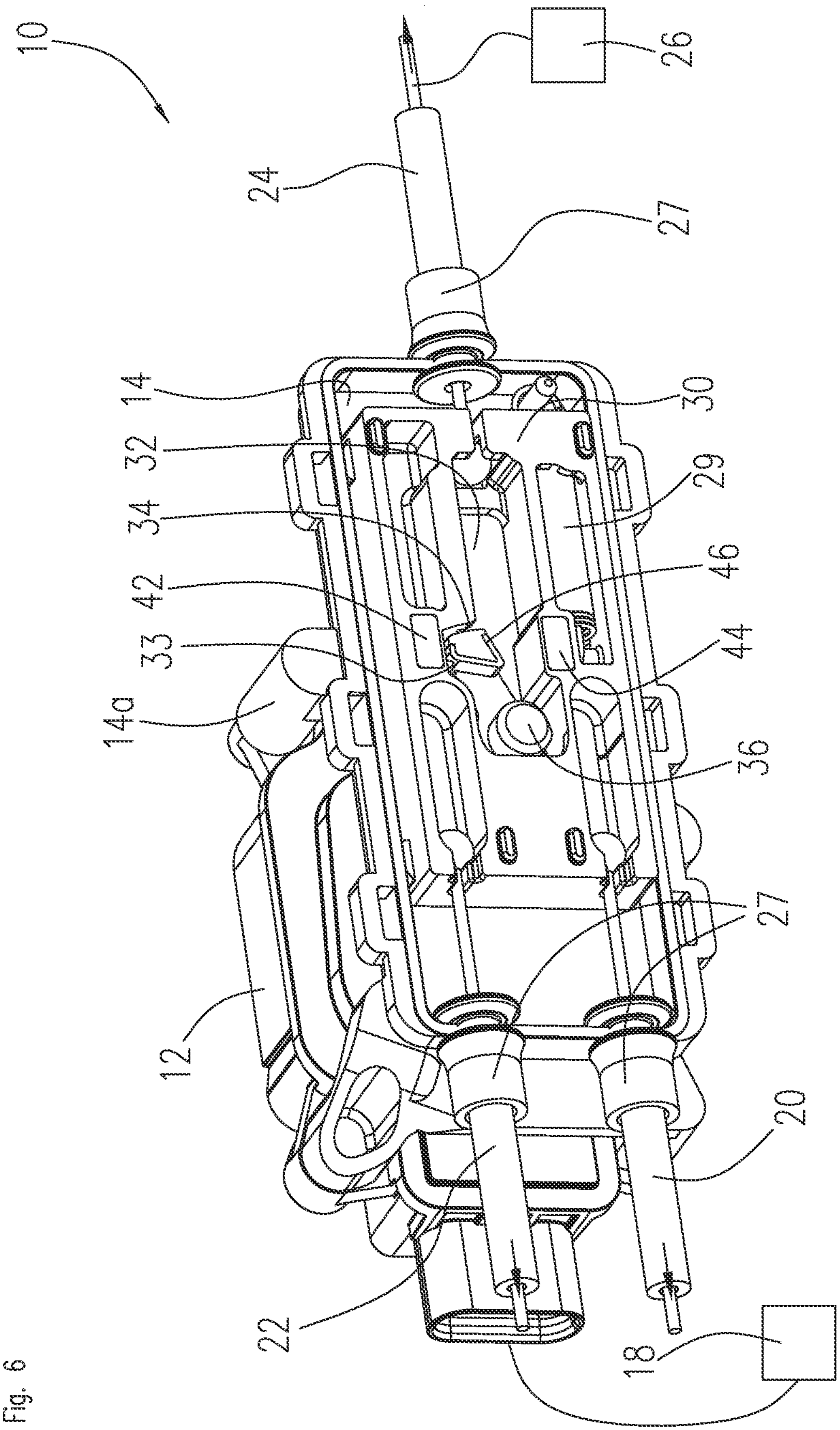
FIG. 6 shows the safety assembly of FIG. 5, with the latch preventing displacement of the slider from the initial position to the actuated position.

FIG. 6 shows the transmission element 28 in a state in which an actuating force is applied that is generated by one of the two actuating elements 20 or 22. The transmission element 28 can only move until the free end of the latch 38 comes into contact with the blocking shoulder 34. Thus, movement of the transmission element 28 is blocked and the trunk lock 26 cannot be unlocked.

Figure 7:
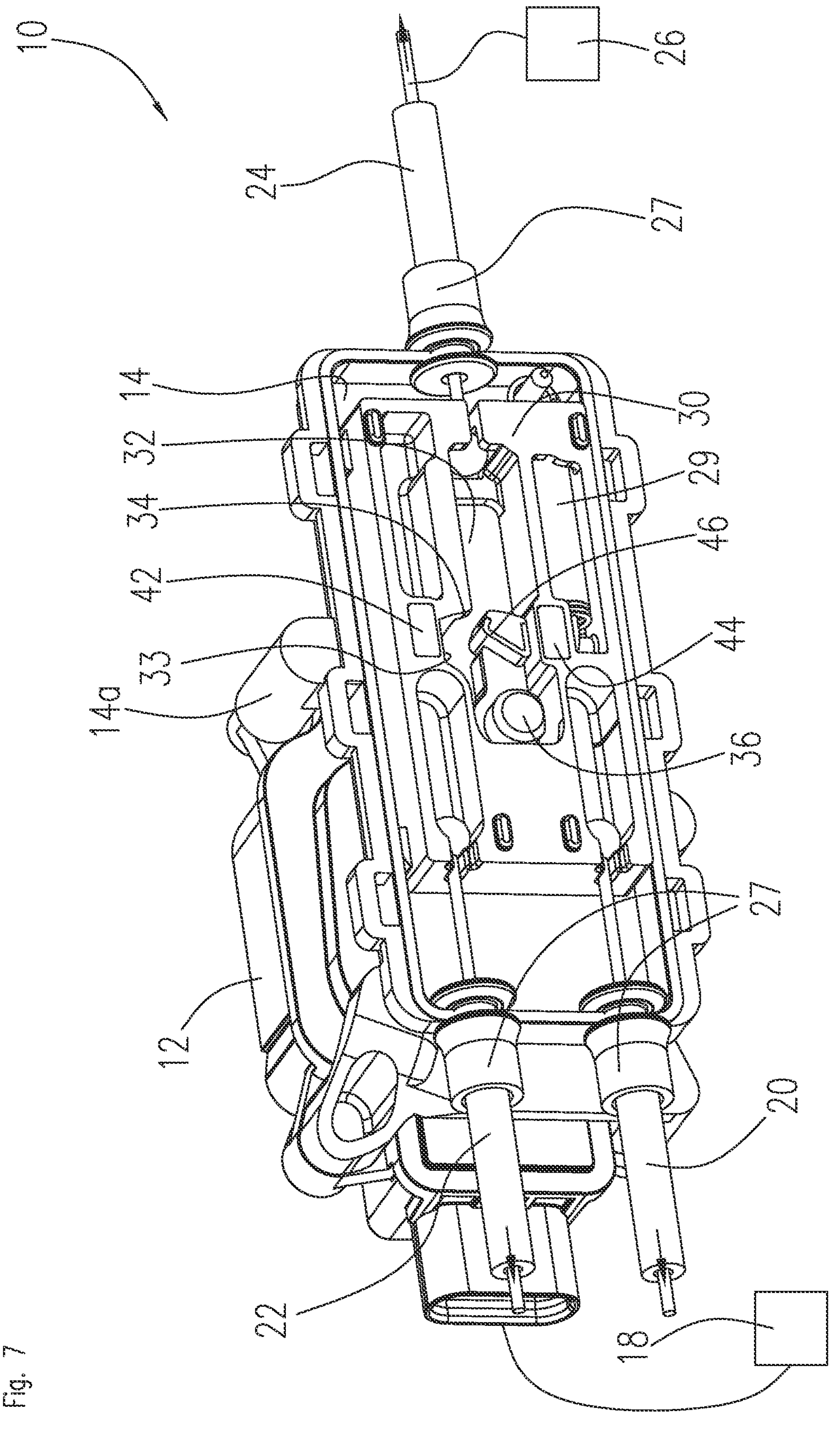
FIG. 7 shows the safety assembly of FIG. 5, with the latch adjusted from the blocking position to the actuating position.

When the speed of the vehicle falls below the limit value again, the latch 36 is returned to the actuating position. This is shown in FIG. 7. The trunk lock 26 can now be fully unlocked.

When the latch is shifted from the actuating position to the blocking position or vice versa, it is not necessary for the controller to receive an external signal about the position of the latch 36. Since the electric motor 12 that is used to shift the latch 36 is a brushless electric motor, a signal about the position of the rotor is available during operation. Therefore, the position of the latch 36 can be inferred at any time by counting the revolutions of the rotor.

Should the position of the latch 36 ever be "lost", the safety assembly is able to re-determine the position simply in that the latch 36 is moved in either of the two directions until the controller determines by an increase in the motor current or a decrease in the rotational speed of the rotor that one of the two end positions of the latch 36 has been reached. As from this point in time, the other end position of the latch 36 can be approached by controlling the electric motor 12 by the previously known number of revolutions in the opposite direction.

The invention claimed is:

1. A safety assembly for preventing the opening of a trunk lock under predefined vehicle conditions, comprising a transmission element which is engaged by an interior-side actuating element and a trunk-side actuating element and which is coupled to a trunk lock, wherein a latch is provided which is adjustable between an actuating position, in which an actuating force can be transmitted from at least one of the actuating elements to the trunk lock, and a blocking position, in which an actuating force is not transmitted to the trunk lock, a gearing and a brushless electric motor being associated with the latch, wherein the latch can be transferred between the actuating position and the blocking position by the gearing and the brushless electric motor, wherein a magnet is provided which can fix the latch in the blocking position.

2. The safety assembly according to claim 1, wherein the transmission element is a slider and the latch is attached to a mounting plate to which the slider is mounted for displacement.

3. The safety assembly according to claim 2, wherein the latch is arranged in a slot within the slider, the slot including a blocking shoulder with which the latch can cooperate in the blocking position.

4. A safety assembly for preventing the opening of a trunk lock under predefined vehicle conditions, comprising a transmission element which is engaged by an interior-side actuating element and a trunk-side actuating element and which is coupled to a trunk lock, wherein a latch is provided which is adjustable between an actuating position, in which an actuating force can be transmitted from at least one of the actuating elements to the trunk lock, and a blocking position, in which an actuating force is not transmitted to the trunk lock, a gearing and a brushless electric motor being associated with the latch, wherein the latch can be transferred between the actuating position and the blocking position by the gearing and the brushless electric motor, wherein a magnet is provided which can fix the latch in the actuating position.

5. The safety assembly according to claim 2, wherein the magnet is received in a pocket on the slider.

6. The safety assembly according to claim 5, wherein the magnet is snap-fitted within the pocket.

7. The safety assembly according to claim 2, wherein a second magnet is provided which can fix the latch in the actuating position and wherein the second magnet is received in a pocket on the slider.

8. The safety assembly according to claim 7, wherein the second magnet is snap-fitted within the pocket.

9. The safety assembly according to claim 4, wherein the transmission element is a slider, wherein the latch is provided with an anti-wear part made of a ferromagnetic material, which engages around the portions of the latch that cooperate with the slider in the actuating position and in the blocking position, and which can cooperate with the magnet.

10. A method of controlling a latch of a safety assembly for preventing the opening of a trunk lock under predefined vehicle conditions, the safety assembly comprising a transmission element which is engaged by an interior-side actuating element and a trunk-side actuating element and which is coupled to a trunk lock, wherein a latch is provided which is adjustable between an actuating position, in which an actuating force can be transmitted from at least one of the actuating elements to the trunk lock, and a blocking position, in which an actuating force is not transmitted to the trunk lock, a gearing and a brushless electric motor being associated with the latch, wherein the latch can be transferred between the actuating position and the blocking position by the gearing and the brushless electric motor, the method being carried out by means of a controller that receives a speed signal and a trunk lock signal, wherein a) the controller controls the electric motor and moves the latch to the blocking position as soon as it receives a speed signal which is above a predefined threshold value when the trunk lock is partly open;

b) the controller controls the electric motor and moves the latch back to the actuating position as soon as the controller receives a speed signal which is below the predefined threshold value again; and c) when controlling the electric motor, the controller receives a signal of the electric motor from which the controller can infer the position of the latch.

* * * * *